(12) United States Patent
Berg et al.

(10) Patent No.: US 12,553,786 B2
(45) Date of Patent: Feb. 17, 2026

(54) OPERATING METHOD FOR A GROUP OF PRESSURE SENSORS

(71) Applicant: INFICON AG, Balzers (LI)

(72) Inventors: Christian Berg, Stäfa (CH); Rolf Enderes, Malans (CH); Martin Wüest, Malans (CH); Bernhard Andreaus, Rapperswil (CH)

(73) Assignee: INFICON AG, Balzers (LI)

( * ) Notice: Subject to any disclaimer, the term of this patent is extended or adjusted under 35 U.S.C. 154(b) by 196 days.

(21) Appl. No.: 18/030,438

(22) PCT Filed: Oct. 14, 2020

(86) PCT No.: PCT/EP2020/078924
§ 371 (c)(1),
(2) Date: Apr. 5, 2023

(87) PCT Pub. No.: WO2022/078593
PCT Pub. Date: Apr. 21, 2022

(65) Prior Publication Data
US 2023/0366766 A1    Nov. 16, 2023

(51) Int. Cl.
*G01L 21/34* (2006.01)
*G01L 9/00* (2006.01)
(Continued)

(52) U.S. Cl.
CPC ............ *G01L 21/34* (2013.01); *G01L 9/0075* (2013.01); *G01L 21/32* (2013.01); *G01L 27/005* (2013.01)

(58) Field of Classification Search
CPC ....... G01L 21/34; G01L 9/0075; G01L 21/32; G01L 27/005; G01L 9/0072; G01L 15/00; G01L 21/12; G01L 9/0076
See application file for complete search history.

(56) References Cited

U.S. PATENT DOCUMENTS 6,619,131 B2 * 9/2003 Walchli ................. G01L 9/0075
  73/718
11,054,331 B2   7/2021 Ishihara et al.
(Continued)

FOREIGN PATENT DOCUMENTS

DE         19860500 A1    7/2000
DE      102005029114 A1    1/2007
(Continued)

OTHER PUBLICATIONS

International Search Report with translation, and Written Opinion received in corresponding International Application No. PCT/EP2020/078924, dated Sep. 24, 2021, in 21 pages.

*Primary Examiner* — Amy He
(74) *Attorney, Agent, or Firm* — Procopio, Cory, Hargreaves & Savitch LLP

(57) ABSTRACT

A method for operating a group of pressure sensors is provided. First and second pressure sensors respectively have first and second pressure measurement ranges, and are arranged to measure the pressure in a common measurement volume, and have measurement ranges that overlap in a range. The method comprises: aa) reading out first and second measurement signals respectively from the first and second pressure sensors substantially simultaneously while the pressure in the common measurement volume is in the overlapping range; bb) stipulating the first measurement signal which has been read out as the adjustment point for the second pressure sensor; cc) determining at least one calibration parameter, in particular a gas-dependent calibration parameter, for the second pressure sensor as a function of the first measurement signal, as a function of the adjustment point for the second pressure sensor, as stipulated in bb), and as a function of the second measurement signal.

19 Claims, 6 Drawing Sheets

(51) Int. Cl.
*G01L 21/32* (2006.01)
*G01L 27/00* (2006.01)

(56) References Cited

U.S. PATENT DOCUMENTS

2019/0226936 A1 7/2019 Ishihara et al.
2020/0103323 A1 4/2020 Plochinger

FOREIGN PATENT DOCUMENTS

EP 0379841 A2 8/1990
JP 2019128190 A 8/2019

* cited by examiner

OPERATING METHOD FOR A GROUP OF PRESSURE SENSORS

CROSS-REFERENCE TO RELATED APPLICATIONS

This application is a U.S. National Stage entry of PCT Application No: PCT/EP2020/078924, filed Oct. 14, 2020, the contents of which are incorporated herein by reference.

The present invention relates to a method for operating a group of pressure sensors. Further, the invention relates to a method for operating a vacuum process system, an apparatus for carrying out the method, and a computer program product.

Various types of pressure sensors are known in the prior art. These include pressure sensors whose measuring principle is based on the deformation of a diaphragm by a pressure difference between the two sides of the diaphragm, such as so-called capacitance diaphragm gauges (abbreviated: CDG). So-called heat conduction vacuum gauges determine the pressure via the pressure-dependent heat conduction of a gas, for example, in the case of a Pirani vacuum gauge or Pirani sensor, via the determination of the heat power which is given off by a current-carrying wire to the surrounding gas. Ionization gauges, another type of pressure sensor, indirectly measure the pressure by means of the gas-type-dependent determination of the gas density. By ionizing the gas molecules by means of electrons, the gas density is determined based on the neutralization rate of the ions on a collector electrode, with the neutralization rate being determined by means of a current measurement.

Different types of pressure sensors have different measurement ranges. For example, there are pressure sensors that provide meaningful readings at atmospheric pressure, but can no longer detect differences at very low pressures, such as fine vacuum or high vacuum. Other vacuum pressure sensors require a pressure in the millibar (mbar) range to operate at all and can resolve very low pressures. In the prior art, it is known to use a group of pressure sensors, for example consisting of two pressure sensors with overlapping measurement ranges, to cover a larger pressure measurement range than a single pressure sensor type can. For example, the PCG550 product family of INFICON AG combines a Pirani sensor and a ceramic capacitance diaphragm gauge in one measuring device, wherein the measurement ranges of the Pirani sensor and the ceramic capacitance diaphragm gauge overlap.

A method for evaluating the output signal of two pressure sensors is known from the publication EP 0 658 755 A1. In this publication, in particular for the combination of cold cathode ionization sensors and Pirani sensors, a weighting technique in the transition area of the respective sensor measurement ranges is proposed for obtaining a substantially extended, unambiguous measurement range compared with the measurement ranges of the respective sensor types, by means of which the sensor characteristics are continuously transferred into one another in a one-to-one manner.

It was the object of the present invention to provide an alternative operating method. In particular, the object was to provide an operating method that increases the accuracy of the pressure measurement over the entire pressure measurement range.

This object is solved by the method according to exemplary aspects. The method according to the invention is a method for operating a group of pressure sensors. The group of pressure sensors comprises at least one first pressure sensor having a first pressure measurement range and at least one second pressure sensor having a second pressure measurement range. The first and second pressure sensors are arranged to measure the pressure in a common measurement volume. The first and second pressure measurement ranges overlap in an overlap pressure measurement range. The method comprises the steps of:

aa) reading out a first measurement signal from the first pressure sensor and a second measurement signal from the second pressure sensor substantially at the same time while the pressure in the common measurement volume is in the overlap pressure measurement range;

bb) stipulating the first measurement signal which has been read out as the adjustment point for the second pressure sensor; cc) determining at least one calibration parameter for the second pressure sensor as a function of the first measurement signal, as a function of the adjustment point as stipulated in step bb) and as a function of the second measurement signal.

The inventors have recognized that as a result of this method an accurate determination of the pressure is possible. In particular, a surprisingly simple way of achieving a large degree of independence of the read pressure from the gas type or gas composition can be achieved if at least one of the pressure sensors is a pressure sensor of a type that provides a measurement signal independent of the gas composition.

One or more of the pressure sensors in the group of pressure sensors may be a vacuum pressure sensor, i.e. a pressure sensor which is used, for example, to measure pressure in a rough vacuum (i.e. in the pressure range from about 1 mbar to 1013 mbar, i.e. to atmospheric pressure), in fine vacuum (i.e. in the pressure range from $10^{-3}$ mbar to 1 mbar), in high vacuum (i.e. in the pressure range from $10^{-8}$ mbar to $10^{-3}$ mbar), or a combination of two or three of said vacuum pressure ranges. The principle of the present invention also works for pressure sensors for measuring pressures close to atmospheric pressure or for overpressure sensors.

The at least one calibration parameter can in particular be a gas-type-dependent calibration parameter.

Step aa) is carried out at least once. Step aa) can also be carried out several times, in particular at different pressures, in order to collect measurement data on the basis of which a plurality of calibration parameters can be adjusted in step cc). For example, based on two measurements according to step aa) performed at different pressures, an offset and a slope can be determined. This is advantageous, for example, for the gas type water vapor, for which the slope of the Pirani range deviates from the normal slope, so that the curve "indicated pressure" versus "effective pressure" would not be described sufficiently accurately by an offset or a factor alone.

As a specific example, the group of pressure sensors may include a 13 mm CDG as the first pressure sensor and a Pirani sensor as the second pressure sensor. In this case, the adjustment point can be selected in the 100 mTorr pressure range, i.e. approximately one decade above the lower edge of the measurement range of the first pressure sensor designed for 10 Torr full scale. In this example, the gas-type-dependent calibration parameter of the second pressure sensor can be the factor by which the measurement signal of the Pirani sensor at the gas to be calibrated and at the pressure defined by the adjustment point deviates from the measurement signal obtained with nitrogen at the pressure according to the adjustment point.

In particular, step cc) can be carried out with a known gas type in the measurement volume or successively with a plurality of gases differing from each other in gas type (e.g.

air, nitrogen, oxygen, hydrogen, helium, argon, etc.) or concentration ratios (e.g. 20% helium, 80% nitrogen) in the measurement volume.

Calibration parameters can then be stored, for example, in tabular form for different gas types. In this way, the combination of the second measurement signal with information about the gas type present in the measurement volume can be determined with increased precision. The information about the gas type present in the measurement volume can be provided, for example, by a control unit that controls a process in a vacuum chamber. The information may be, for example, that an inlet valve for an inert gas, for example helium or argon, has been opened.

One possible calibration parameter that can be adjusted in step cc) is a factor by which the pressure for the selected gas type deviates from a pressure that would correspond to the pressure of a reference gas, for example nitrogen, if the measurement signal were the same.

Thus, on the one hand, the gas-type-dependent pressure measurement signal of the second pressure sensor can be adjusted by this factor so that the pressure measurement is corrected accordingly and the gas-type dependence is minimized even in the range where only the second pressure sensor measures. On the other hand, the factor provides information about the gas composition with respect to the reference gas.

Compact capacitance diaphragm gauges with small size are available for example as a product of INFICON under the designation "Porter™ CDG020D", they reach full scale of their pressure indication at approx. 10 . . . 1000 Torr and can measure pressures down to 10 mTorr (at full scale 10 Torr). The method according to the invention is suitable for the operation of a combination of two or more of the mentioned pressure sensors, which can measure in a common measurement volume.

For example, the BCG450 Triple-Gauge™ covers the range from atmospheric pressure to ultra-high vacuum through three sensors. The INFICON BCG450 combination gauge (Triple-Gauge™) combines the advantages of three different technologies in a single, compact and economical device for measuring process and base pressure in the range of $5 \times 10^{-10}$ to 1500 mbar ($3.75 \times 10^{-10}$ to 1125 Torr). The BCG450 is designed to replace three individual sensors (Hot Ion, Pirani and a small 11 mm diameter CDG). This reduces the cost and decreases the space required at the facility. This combination device can be operated, for example, with the method according to the invention.

However, the method according to the invention is also suitable for devices in which different pressure sensors are attached to the same vacuum chamber, thus forming a group of pressure sensors which have a common measurement volume.

Embodiments of the method result from the exemplary features.

In one variant of the method, the adjustment point for the second pressure sensor is in the pressure range $10^{-2}$ mbar to $10^0$ mbar, in particular in the pressure range 0.1 to 0.4 mbar.

For example, in a combination of CDG and Pirani sensor, an overlap pressure range of the two pressure sensors can advantageously be placed by the sizing of the CDG in a pressure range where the gas-type dependence of the Pirani sensor is characterized in a double-logarithmic diagram by linear and substantially parallel shifted curves for each gas type, i.e. avoiding the range of higher pressures where non-linear diverging gas-type characteristics occur. This further increases the accuracy. This variant of the method is particularly suitable for the operation of a group of pressure sensors formed by the combination of two CDGs dimensioned for different pressure measurement ranges and a Pirani sensor, wherein a first CDG with a lower pressure measurement range provides for the overlap range with the linear range of the Pirani sensor and a second CDG with a higher pressure measurement range extends the effective measurement range of the group of pressure sensors towards high pressures.

A variant of the method further comprises the steps of:
dd) a further time substantially simultaneously reading out a further first measurement signal of the first pressure sensor and a further second measurement signal of the second pressure sensor while the pressure in the common measurement volume is in the overlap pressure measurement range and wherein the pressure in the common measurement volume is different from the pressure in step aa), in particular wherein the pressure in the common measurement volume differs by a factor of two, by a decade or more from the pressure in step aa);
ee) stipulating the further first measurement signal which has been read out as a further calibration adjustment point for the second pressure sensor;
ff) determining a further calibration parameter (K2), in particular a further gas-dependent calibration parameter, for the second pressure sensor as a function of the further first measurement signal, as a function of the further adjustment point for the second pressure sensor stipulated in step ee) and as a function of the further second measurement signal.

This variant can be extended to the recording of three or more measuring points and determination of further calibration parameters, wherein the number of calibration parameters corresponds at most to the number of measuring points. In particular, more measuring points can be recorded than calibration parameters are to be determined. In this case, a compensation algorithm can be used to determine a set of calibration parameters that optimally matches the measurement points. Thus, the calibration parameters are less dependent on measurement noise.

In one variant of the method, a current pressure measurement value in the measurement volume is determined as a function of a current second measurement signal and the previously determined at least one calibration parameter or the previously determined calibration parameters.

This variant of the method includes the actual step of determining current pressure values, using the previous calibration of the second pressure sensor. This calibration is based on the information obtained in the overlap pressure measurement range and can now be applied to the entire second measurement range.

In one variation, the method further comprises the step of:
gg) deciding whether a gas composition present in the common measurement volume deviates from a target specification, taking into account a deviation of the current pressure measurement value with respect to a pressure measurement value derived from the first measurement signal, wherein the reading out of the first measurement signal is performed substantially simultaneously with the reading out of the current second measurement signal and while the pressure in the common measurement volume is in the overlap pressure measurement range.

Step gg) corresponds to a check step for the gas composition. By specifying a tolerance range for acceptable deviations from the target specification, a yes/no decision can be made, e.g. on whether a next process step should be executed. The inventors have recognized that a functionality can be obtained here in a very simple way, for which a residual gas analyzer would normally be required.

This variant can be used, for example, to detect gas composition variations in PVD processes.

In a variant of the method, the further calibration parameter determined in step ff) is a slope in a double-logarithmic function diagram of the second measurement signal as a function of the first measurement signal, or a slope in a double-logarithmic function diagram of the second measurement signal as a function of the first measurement signal is calculated from the calibration parameter determined in step cc) and the calibration parameter determined in step ff). The method further comprises the steps of:

hh) determining a deviation of this slope from a slope expected for a reference gas, for example the gas nitrogen;
ii) comparing the deviation determined in step hh) with a predetermined tolerance threshold for the deviation;
jj) triggering an alarm for the presence of water vapor in the common measurement volume if the tolerance threshold is exceeded.

The inventors have recognized the fact that in the case of water vapor the said slope differs from the slope observed for practically all relevant residual gases, so that based on this property the presence of water vapor can be detected. This property is clearly pronounced for Pirani sensors.

In one variant of the method, the first pressure sensor is a pressure sensor of a pressure sensor type independent of a gas composition in the measurement volume. Further, the second pressure sensor is a pressure sensor of a pressure sensor type dependent on the gas composition in the measurement volume, in particular the second pressure sensor can be a heat conduction vacuum meter, especially according to Pirani or with thermocouple sensor, or
a cold cathode ionization vacuum meter, in particular a Penning ionization vacuum meter, or a non-inverted magnetron or an inverted magnetron, or
an ionization vacuum meter with hot cathode, in particular an ionization vacuum meter according to Bayard-Alpert, an ionization vacuum meter with extractor or with triode, or
a spinning rotor gauge sensor.

Pressure sensors can be divided into two classes of pressure sensor types, namely pressure sensors which are directly sensitive to a force per area, and pressure sensors which use an indirect effect of pressure on another physical quantity, such as the thermal conductivity of the gas under the pressure being measured, to determine the pressure. The latter type of pressure sensor is usually dependent on the type of gas. The inventors have recognized that a group of pressure sensors comprising a first pressure sensor of the first type and a second pressure sensor of the second type particularly benefits from the method of operation according to the invention.

Depending on the desired measurement range, i.e. depending on the pressure range in which a high measuring accuracy is achieved, a combination of pressure sensors can be selected.

Heat conduction vacuum gauges according to Pirani have a measurement range of approx. 100 . . . 0.1 Pa, ionization vacuum gauges with cold cathode according to Penning have a measurement range of approx. $10^0$ . . . $10^{-9}$ Pa and ionization vacuum gauges with hot cathode according to Bayard-Alpert have a measurement range of approx. 1 . . . $10^{-8}$ Pa, respectively $10^{-1}$ . . . $10^{-10}$ Pa with extractor measuring systems, respectively $10^3$ . . . $10^{-10}$ Pa for triodes.

Heat conduction vacuum gauges according to Pirani can be used up to atmospheric pressure $10^5$ Pa, but with greatly reduced accuracy.

In one variant of the method, the first pressure sensor is a diaphragm gauge, in particular a capacitance diaphragm gauge, especially a ceramic capacitance diaphragm gauge, or an optical diaphragm gauge.

Diaphragm gauges respond directly to force per area and are therefore gas type independent.

In one variation of the method, the second pressure sensor is a heat conduction vacuum gauge, in particular Pirani or a thermocouple.

Heat conduction vacuum gauges have a distinct gas-type dependence and therefore benefit from calibration according to the method of the invention.

In one variant of the method, steps aa), bb) and cc) are repeated at regular intervals, in particular once a day or once a week.

The time intervals can be adapted in particular to the timing of further process steps. Depending on the context, the execution of step a), namely a lowering of the pressure in the common measurement volume into the low-pressure range, is also useful beforehand, so that the entire sequence of steps aa), bb) and cc) is repeated at regular time intervals in each case. The sequence of steps aa), bb) and cc) can also be repeated as a function of the process, for example when strong temperature cycles are run in a vacuum process plant.

In one variation of the method, the method is a method for operating a vacuum process system comprising the group of pressure sensors. Steps aa), bb) and cc) are repeated once per process cycle of the vacuum process system.

Such a process cycle can include, for example, aeration, introduction of substrates, lowering of the pressure into the high vacuum range, allowing a process gas to flow in, extraction of the process gas, aeration and removal of substrates. Steps aa) to cc) of the method can each be carried out in conjunction with lowering the pressure into the high vacuum range. This variant can be combined, for example, with an automatic pressure measurement quality check, wherein several pressure values are determined at a short time interval in relation to the time duration of a process step, and wherein it is checked whether these pressure values lie within a defined value range. In this way, it can be ruled out that a pressure change is too fast to record good quality data.

For example, the method may be automatically triggered whenever an activation pressure range is reached or crossed. For example, overlap pressure measurement range, as mentioned above, can be the activation pressure range for determining a calibration parameter of a Pirani sensor.

In a variant of the method, the second pressure measurement range comprises a low-pressure range in which the pressure is lower than a lower limit of the first pressure measurement range. The method comprises the additional steps of:

kk) checking whether the low-pressure range has been reached by means of a second measurement signal from the second pressure sensor;
ll) reading out a first measurement signal of the first pressure sensor while the pressure in the common measurement volume is in the low-pressure range; and
mm) stipulating the first measurement signal which has been read out as a zero point signal for the first pressure sensor.

For example, with capacitance diaphragm gauges, it is possible to determine which value of an output signal corresponds to a pressure of zero (or a pressure at the lower end of the measurement range). This value drifts slowly and can make the interpretation of the measurement signal difficult. With this variant of the method, this zero point can be determined and updated again and again as needed, while ensuring that there is a sufficiently low pressure in the common measurement volume of the two pressure sensors to be able to determine the zero point. For example, for the PCG550 product family mentioned above, the Pirani sensor can be used as a second pressure sensor to establish the zero point of the CDG, which in this case has the role of the first pressure sensor, in the method according to the invention. A combination of determination of a calibration parameter and prior zeroing according to this variant of the method significantly increases the accuracy of the pressure measurement over the entire pressure measurement range.

A variant of the method further comprises the steps of:
nn) increasing the pressure in the common measurement volume to the first pressure measurement range;
oo) reading out a current first measurement signal of the first pressure sensor;
pp) determining a current pressure measurement value as a function of the current first measurement signal and the zero point signal determined in step mm), in particular as a function of a difference of the current first measurement signal and the zero point signal.

In this way, the current pressure reading is a current pressure reading with correct zero.

In one variant of the method, the low-pressure range comprises only pressures which are lower than the lower limit of the first pressure measurement range by at least a factor of ten, in particular by at least a factor of one hundred.

The inventors have recognized that with this variant, the zero point for the first sensor can be determined particularly accurately.

In one variant of the method, the low-pressure range includes the range $10^{-3}$ mbar to $10^{-4}$ mbar.

This variant can be realized, for example, in combination with the variant mentioned above, in which the second pressure sensor is a Pirani heat conduction vacuum gauge. Ceramic capacitance gauges in the role of the first pressure sensor benefit particularly from a regular determination of the zero point according to this variant of the method.

In a variant of the method, the group of pressure sensors comprises at least three pressure sensors. The steps according to the method of the invention are applied to a first pair of pressure sensors of the group of pressure sensors and the steps according to the method of the invention are also applied to a second pair of pressure sensors of the group of pressure sensors. In this case, one of the pressure sensors of the first pair is also a pressure sensor of the second pair.

According to this variant, the method according to the invention can be extended in cascade to a group of pressure sensors with more than two pressure sensors, wherein in a first pair of pressure sensors one has the role of the first pressure sensor and the other has the role of the second pressure sensor. In another pair of pressure sensors, the second pressure sensor can have the role of the first pressure sensor according to the method, and so on. The prerequisite for such a cascade-like extension of the total pressure measurement range of the group is that there are in each case overlapping measurement ranges of two adjacent pressure sensors with respect to their measurement range.

For example, such a cascade-like chaining of measurement ranges of different pressure sensors is possible in a group of pressure sensors comprising a capacitance diaphragm gauge, a Pirani sensor and an ionization gauge. For example, an adjustment point for the capacitance diaphragm gauge as the first pressure sensor of the first pair and the Pirani sensor as the second pressure sensor of the first pair can be set at about 1 mbar. Further, an adjustment point for the Pirani sensor as the first pressure sensor of the second pair and for the ionization gauge as the second pressure sensor of the second pair can be set at about $10^{-3}$ mbar. The calibrations are cascaded according to this variant. For example, the ionization pressure gauge may be a Bayard-Alpert type pressure gauge or another of the ionization gauges mentioned above. For example, the group of pressure sensors may concern a fourth pressure sensor in the form of a capacitance diaphragm gauge with full deflection at atmospheric pressure. In combination, such a "quadruple" pressure sensor with a total measurement range from atmospheric pressure down to a pressure of 10-10 mbar can thus be obtained, which achieves a high accuracy, respectively an extensive independence of the gas type, over the entire measurement range by operation according to the present invention.

Further, the invention also relates to an apparatus according to an exemplary aspect, which is an apparatus for carrying out the method according to the invention.

The apparatus includes:
a group of pressure sensors,
wherein the group comprises at least a first pressure sensor having a first pressure measurement range and a second pressure sensor having a second pressure measurement range, wherein the first and second pressure sensors are arranged to measure pressure in a common measurement volume, and wherein the first and second pressure measurement ranges overlap in an overlap pressure measurement range; and
a control unit which is operatively connected to a first signal output of the first vacuum pressure sensor and to a second signal output of the second vacuum pressure sensor for processing measurement signals of the vacuum pressure sensors.

This apparatus can be realized in particular as a unit (pressure sensor unit, "pressure gauge"), which comprises all mentioned elements in a common housing. For example, this housing may have a standard vacuum flange for connection to a vacuum system. For example, this unit can have a data interface which provides a single processed pressure signal to the outside, wherein this processed pressure signal is obtained by taking into account all calibrations and all available pressure sensors of the group. In particular, this unit may include a computer program product, for example in the form of firmware, which is yet to be discussed.

In one embodiment of the apparatus, the first pressure sensor is a diaphragm gauge. The overlap pressure measurement range, where the first and second pressure measurement ranges overlap, comprises pressure 0.1 mbar. The group of pressure sensors includes a third pressure sensor having a third pressure measurement range, wherein the third pressure measurement range extends the first pressure measurement range to greater pressures.

This embodiment of the apparatus can be realized, for example, by the following combination of pressure sensors: A capacitance diaphragm gauge as the first pressure sensor, a Pirani sensor as the second pressure sensor, and a capacitance diaphragm gauge again as the third sensor. The first pressure sensor can, for example, have a measurement range that includes the pressure 0.1 mbar and covers three decades. The Pirani sensor in this example has a measurement range that also includes the pressure 0.1 mbar. The third pressure sensor may have a third pressure measurement range that has a full scale at atmospheric pressure, extending the pressure range of the entire group of pressure sensors to high pressures. The third pressure measurement range may overlap with the first and/or second pressure measurement ranges. All three pressure sensors of the group may be installed in a common housing.

In one embodiment, the apparatus comprises at least one means for changing the pressure in the common measurement volume, wherein the at least one means for changing the pressure is operatively connected to a pressure control unit for initiating a decrease or an increase of the pressure in the common measurement volume.

The pressure control unit may be the control unit for processing measurement signals from the vacuum pressure sensors, or it may be operatively connected to them, e.g. to transmit the status of valves or pumps or to receive control commands, such as changing the pressure in preparation for an adjustment.

The means for changing the pressure may include, for example, a pump or valves.

Still further, the invention relates to a computer program product according to exemplary aspects.

The computer program product according to the invention comprises instructions which, when the instructions are executed by a control unit of an apparatus of the invention, cause the control unit to perform the steps of the method of the invention.

For example, the computer program product may comprise firmware in a pressure sensor arrangement, or it can consist of firmware in a pressure sensor arrangement.

Exemplary embodiments of the present invention are explained in further detail below with reference to figures, wherein.

Figure 7:
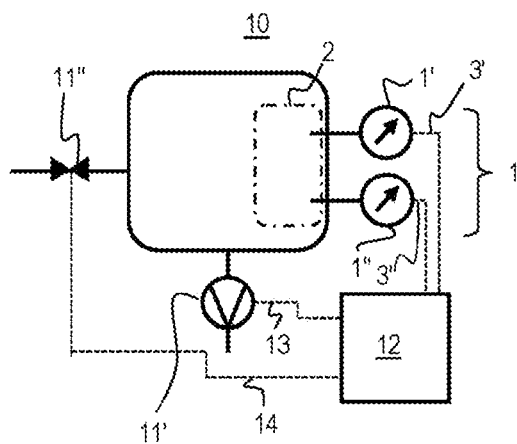
Figure 8:
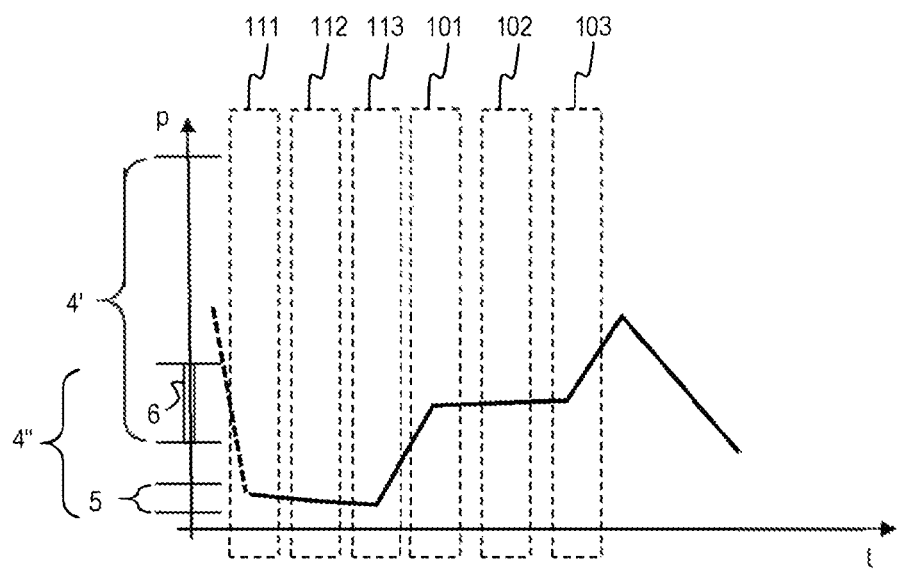
Figure 9:
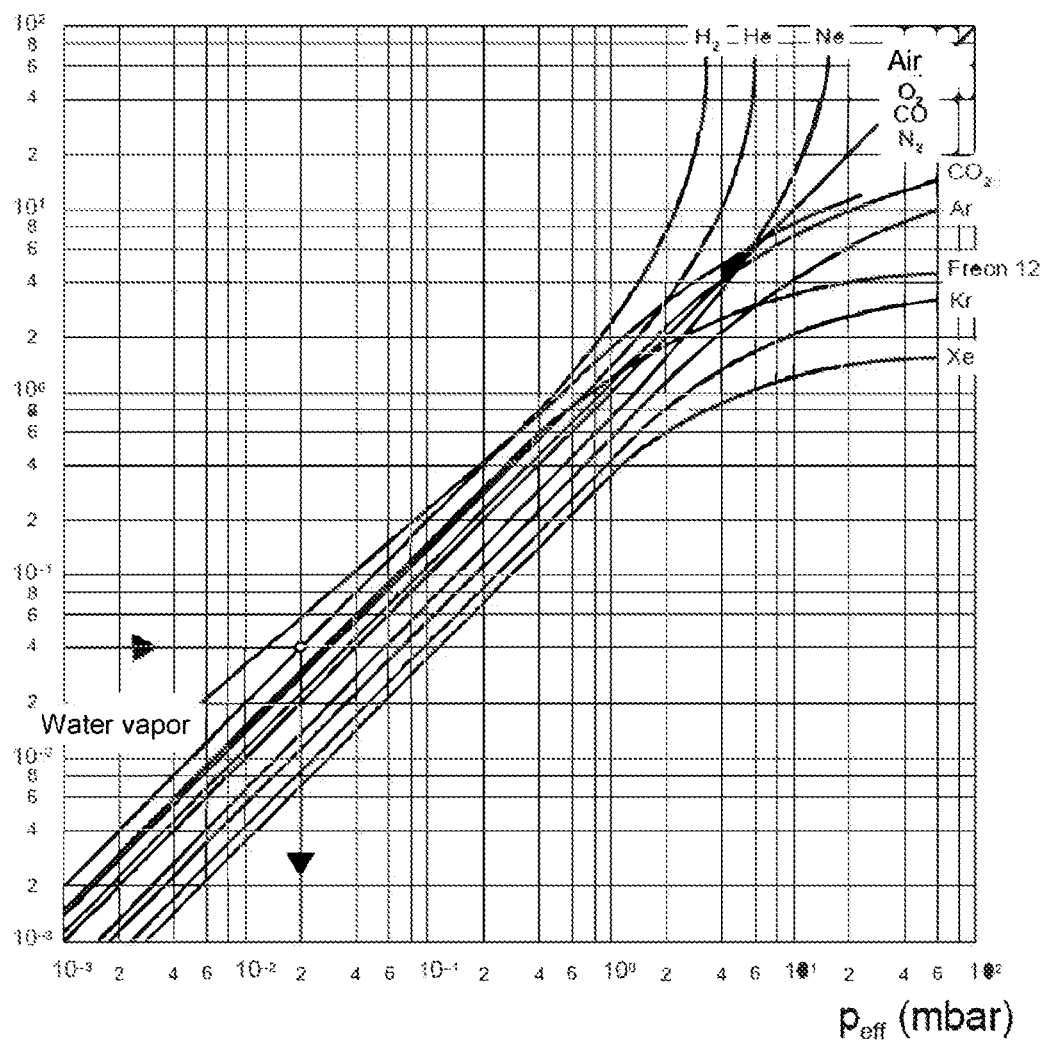
Figure 10:
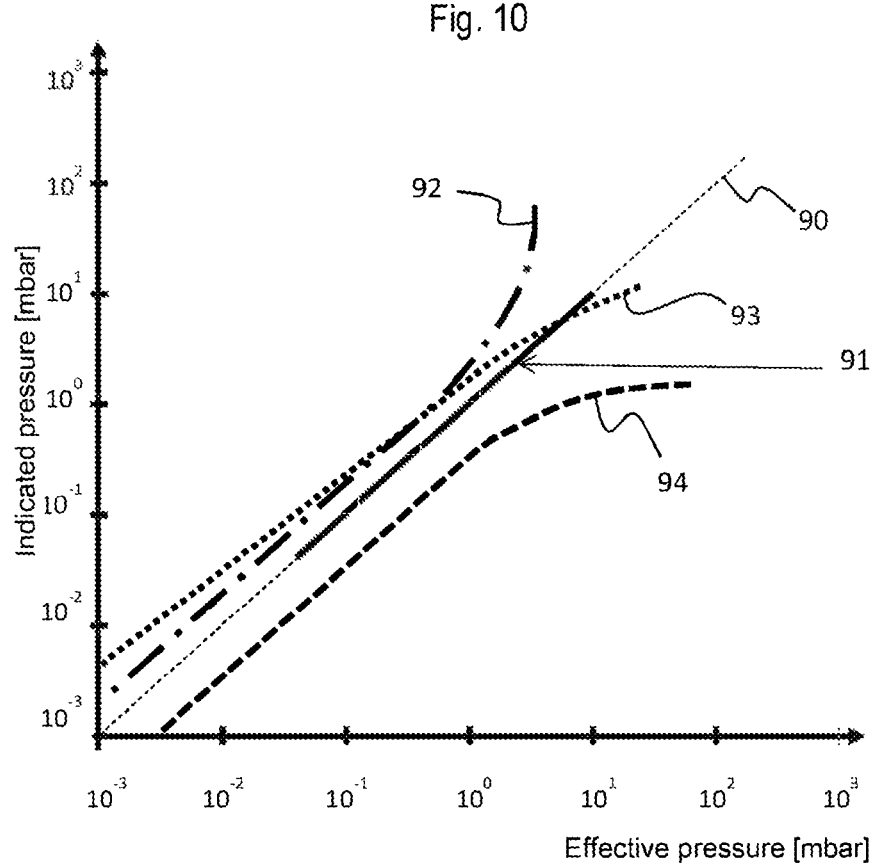
Figure 11:
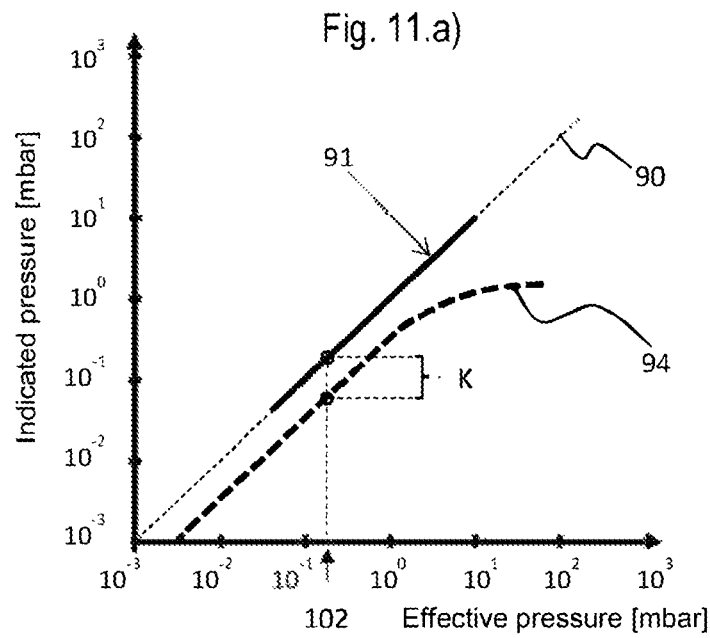
Figure 11:
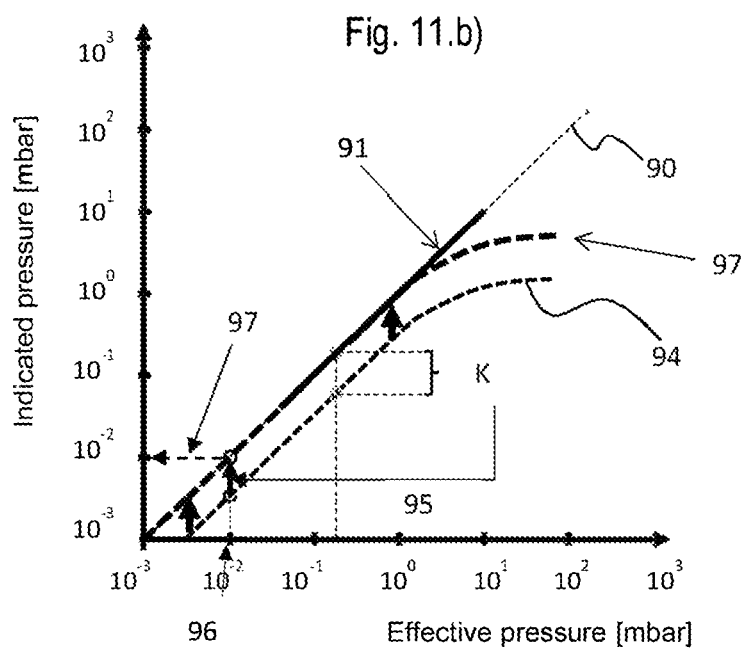
Figure 12:
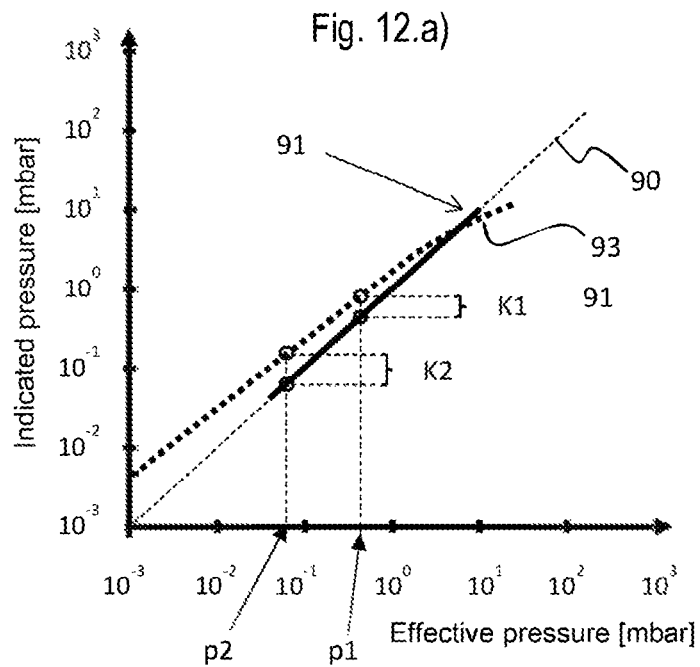
Figure 12:
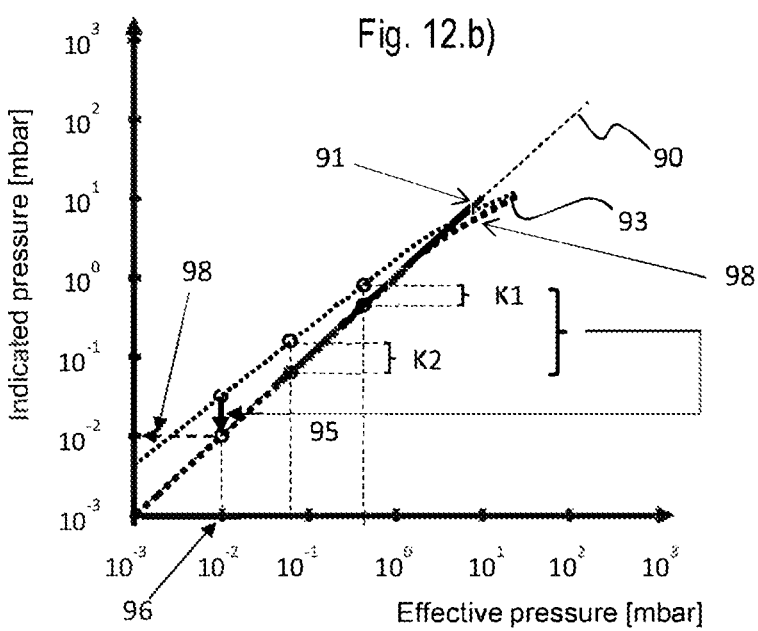

FIG. 7 schematically shows an apparatus for carrying out the method;

FIG. 8 schematically shows a time sequence of the pressure in a variant of the method;

FIG. 9 shows the dependence of a pressure determined by a Pirani sensor on the type of gas in a double-logarithmic diagram;

FIGS. 10 to 12 show, by means of double-logarithmic diagrams of the indicated pressure as a function of the effective pressure, two ways in which the gas-type-dependent pressure measurement signal of the second, gas-type-dependent pressure sensor can be adjusted by the method according to the invention with one or more calibration factors, so that the pressure measurement is also corrected in the range where only the second gas-type-dependent pressure sensor measures, and the gas-type dependence is eliminated.

Figure 1:
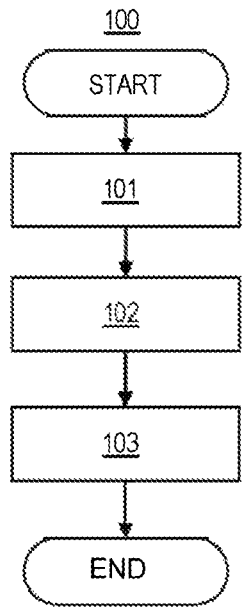
FIG. 1 shows a flow diagram of the method according to the invention.

FIG. 1 shows a flowchart of the method 100 according to the invention. The method comprises the steps of aa) substantially simultaneously reading out 101 a first measurement signal of the first pressure sensor and a second measurement signal of the second pressure sensor while the pressure in the common measurement volume is in the overlap pressure measurement range;

bb) stipulating 102 the first measurement signal which has been read out as the adjustment point for the second pressure sensor;

cc) determining 103 at least one calibration parameter K1, K2, in particular a gas-dependent calibration parameter, for the second pressure sensor as a function of the first measurement signal, as a function of the adjustment point for the second pressure sensor determined in step bb) and as a function of the second measurement signal.

Steps 101, 102, and 103 are performed sequentially.

Figure 2:
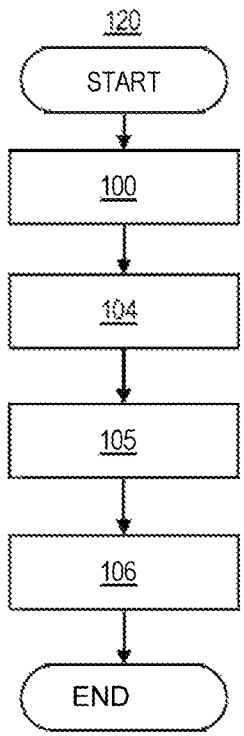
FIG. 2 shows a flowchart of an embodiment of the method.

In FIG. 2, a flowchart of an embodiment 120 of the method is shown. First, all steps of the method 100 according to the invention are carried out. This is followed by the steps of dd) a further time substantially simultaneously reading out 104 a further first measurement signal of the first pressure sensor and a further second measurement signal of the second pressure sensor while the pressure in the common measurement volume is in the overlap pressure measurement range and wherein the pressure in the common measurement volume is different from the pressure in step aa);

ee) stipulating 105 the further first measurement signal which has been read out as a further adjustment point for the second pressure sensor;

ff) determining 106 a further calibration parameter K2, in particular a further gas-dependent calibration parameter, for the second pressure sensor as a function of the further first measurement signal, as a function of the further adjustment point determined in step ee) and as a function of the further second measurement signal.

Figure 3:
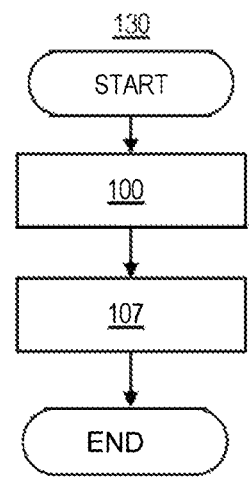
FIG. 3 shows a flowchart of an embodiment of the method.

FIG. 3 shows a flowchart of an embodiment 130 of the method. First, all steps of the method 100 according to the invention are carried out. This is followed by the step gg) deciding 107 whether a gas composition present in the common measurement volume 2 deviates from a target specification, wherein a deviation of the current pressure measurement value from a pressure measurement value derived from the first measurement signal is taken into account, wherein the reading out of the first measurement signal takes place essentially simultaneously with the reading out of the current second measurement signal and while the pressure in the common measurement volume is in the overlap pressure measurement range 6.

Figure 4:
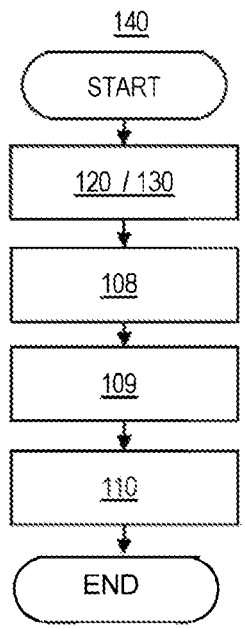
FIG. 4 shows a flow diagram of a further embodiment of the method.

FIG. 4 shows a flow diagram of an embodiment 140 of the method. First, the steps of variant 120 (see FIG. 2) or variant 130 (see FIG. 3) are performed alternatively. This is followed by the steps of hh) determining 108 a deviation of this slope from a slope expected for a reference gas, in this case the gas nitrogen;

ii) comparing 109 the deviation determined in step hh) with a predetermined tolerance threshold for the deviation;

jj) if the tolerance threshold is exceeded, trigger 110 an alarm for the presence of water vapor in the common measurement volume 2.

Figure 5:
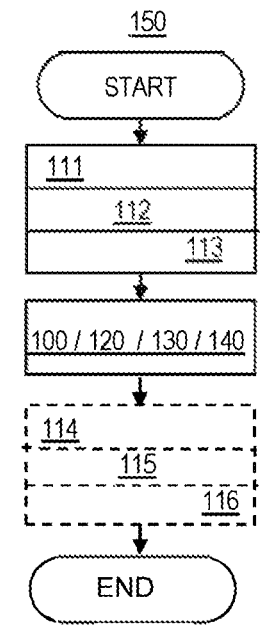
FIG. 5 shows a flowchart of an embodiment of the method comprising zeroing the first pressure sensor.

FIG. 5 shows a flowchart of an embodiment 150 of the method. This is a combination in which the sequence of steps 111, 112, 113 for zeroing the first pressure sensor is carried out in advance before the steps of one of the embodiments follow, alternatively according to one of the diagrams 100, 120, 130 or 140. Shown outlined in dashed lines is a further sequence of steps 114, 115 and 116, the addition of which results in a further embodiment. The blocks separated by arrows in FIG. 5 can be carried out far apart in time. Steps combined in a block are preferably carried out immediately one after the other.

Figure 6:
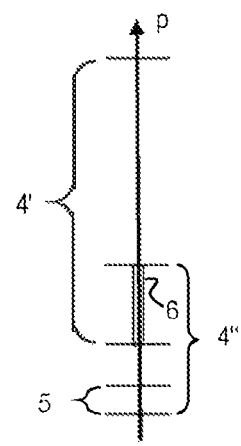
FIG. 6 shows a schematic of possible relative positions of first and second pressure measurement ranges.

FIG. 6 shows schematically the relative position of the first 4' and second 4" pressure measurement range of the first 1' or second 1" pressure sensor of the group of pressure sensors on a pressure axis p. The pressure axis p is to be understood schematically here; it could be, for example, a linear axis or also a logarithmic axis. High pressures are drawn further up on the axis than lower pressures. An overlap pressure measurement range 6 exists, in which the first 4' and the second 4" pressure measurement ranges overlap. The reading out of the first and second measurement signals in step aa) of the method takes place while the pressure in the common measurement volume is in this overlap pressure measurement range 6.

In the example shown here, it is further shown that the second pressure measurement range 4" comprises a low-pressure range 5, in which the pressure is lower than a lower limit of the first pressure measurement range 4'. While the pressure is in this low-pressure range, the pressure sensor with the higher pressure measurement range (4') can be zeroed, see the procedure shown in FIG. 8.

FIG. 7 schematically shows an exemplary apparatus 10 for carrying out the method. The apparatus comprises a group 1 of pressure sensors, having at least one first pressure sensor 1' and one second pressure sensor 1", which can measure pressures in a common measurement volume 2. The measurement volume 2 can in particular be a partial volume of a vacuum chamber, as indicated schematically by the dash-dotted outlined area. The first pressure sensor 1' is set up to forward a first measurement signal 3' to a control unit 12. The second pressure sensor 1" is set up to forward a second measurement signal 3' to the control unit 12. In the example shown, the control unit has an operative connection 13 for controlling a pump 11' and an operative connection 14 for controlling an inlet valve 11". Pump 11' and inlet valve 11" are means for changing the pressure in the chamber to which they are connected, and thus in particular also means for changing the pressure in the common measurement volume 2, which comprises a partial volume of the chamber. The measurement signal and operative connection drawn with dashed lines can be implemented, for example, by wire; they can also be implemented, for example, by radio signals (Bluetooth, etc.) or optical signal transmission.

The parts of the shown device or the complete device can be installed in a common housing. In particular, the group of pressure sensors and the control unit may be combined in a common housing to form a pressure sensor unit. In the arrangement shown, the control unit 12, which is designed to process the measurement signals, also performs the control of the means for changing the pressure. The latter function can also be performed by a separate pressure control unit.

FIG. 8 shows a schematic time-pressure diagram of the pressure in a variant of the method. The time t is shown in the horizontal direction, and the pressure axis p runs in the vertical direction, with the same pressure ranges being shown as in FIG. 6. The pressure curve over time is indicated by the thick line. Dotted rectangles mark the time position of the individual method steps. If necessary, a step of lowering from a pressure above the low-pressure range 5 to the low-pressure range precedes this. The steps of checking 111, reading out 112 and determining 113 of the zero point signal all take place at a pressure in the low-pressure range 5. The zero point signal determined in step 113 can now be used to translate the current first measurement signal into an accurate pressure measurement value which is independent of any zero point drift of the first pressure sensor. After that, in the example shown, the pressure is increased into the overlap pressure measurement range 6. The steps 101, 102 and 103 of the basic sequence of the method according to the invention are carried out in this overlap pressure measurement range 6. This is followed by further steps in which zeroing and calibration parameters are used to increase the measurement accuracy over the entire measurement range of the group of pressure sensors.

FIG. 9 shows in a double-logarithmic representation the dependence of a pressure determined by means of a Pirani sensor on a specific gas type. In the horizontal direction, the "effective" pressure $p_{eff}$ is shown, which is determined with a gas type-independent sensor, e.g. with a CDG pressure sensor, which can have the role of the first pressure sensor in the method according to the invention. In the vertical direction, the pressure p (mbar) read on a Pirani sensor is plotted as a function of the effective pressure $p_{eff}$ (mbar) for different gas types each with a separate curve, see the label for each curve in the top right area of the graph. The pressure range shown is from $10^{-3}$ mbar to $10^2$ mbar on both axes, i.e. over 5 orders of magnitude. In this case, the Pirani sensor is calibrated to show pressure $p_{eff}$ for the gas type air, i.e. the pressure curve to air (Air) is a straight line on the diagonal in the double-logarithmic plot. In a pressure range below about 1 mbar, the effect of the gas type can be described by a factor between $p_{eff}$ and the pressure p measured with the Pirani sensor. At higher pressures, a non-linear deviation from the pressure $p_{eff}$ characteristic of the gas type occurs. The effective pressure $p_{eff}$ can be measured when determining a first pressure measurement value, and the pressure p can be determined in the step of determining a second pressure measurement value. Using stored curves of the type shown in FIG. 9, a statement can be made from the deviation between p and $p_{eff}$ as to whether the gas composition present in the measurement volume matches an expected gas composition or whether the effective gas composition deviates from a target specification (see step gg), 107). For example, the presence of hydrogen ($H_2$) over the entire pressure range shown results in a significantly higher pressure value read at the Pirani sensor than would be expected for the gas type nitrogen ($N_2$), for example. One possible application of this evaluation is leakage measurements. A determination of an extraneous gas, as well as an estimation for its concentration is possible. The extent of the deviation from a target value can be used, for example, as the basis for a go/no-go decision for further process steps.

FIG. 10 shows in a double-logarithmic representation the basic situation for the two possibilities explained in FIGS. 11 and 12, how the gas-type dependent pressure measurement signal of the second, gas-type dependent pressure sensor can be adjusted by the method according to the invention with one or more calibration factors, so that the pressure measurement is corrected accordingly and the gas-type dependence is eliminated also in the range where only the second gas-type dependent pressure sensor measures. The illustration is as in FIG. 9, with the thin dashed line showing the desired optimum output signal 90, for which the following applies: effective pressure (horizontal axis)=indicated pressure (vertical axis). Further shown are signal 91 from the first pressure sensor (identical for all gases in this case), signal 92 from the second pressure sensor in H2, signal 93 from the second pressure sensor in water vapor, and signal 94 from the second pressure sensor in xenon.

Pressures over 6 orders of magnitude from $10^{-3}$ mbar to $10^{+3}$ mbar are shown in the diagram.

FIG. 10 shows the output signals 91 of a gas type-independent sensor 1, in this case a capacitive diaphragm sensor with a full scale of 10 mbar and an operating range of 2.5 decades, and the output signals 92, 93, 94 of a gas-type-dependent Pirani sensor for various gases. This results in an overlap pressure measurement range in the range of $5 \times 10^{-2}$ mbar to about 5 mbar for all gases, with the upper end of the measurement range of the Pirani sensor at 5 mbar for $H_2$ applying as the test gas. The interesting overlap pressure measurement range from $5 \times 10^2$ mbar to approx. 0.4 mbar should be emphasized here, in which the vast majority of gas characteristics of FIG. 9 as FIG. 10 are linear in double-logarithmic representation.

If, as in FIG. 11.a), a calibration parameter K for the Pirani characteristic is determined for xenon in this overlap pressure measurement range by simultaneous reading, the Pirani characteristic can be adjusted by adjusting the curve by means of the calibration factor, as shown in FIG. 11.b), so that a correct measurement signal is output even in the low-pressure range 5, in which the pressure can only be read out by the Pirani. The effect of the adjustment 95 of the signal of the second pressure sensor is illustrated by bold arrows. For example, the curve of the adjusted display signal 97 in xenon is read in a method step at the effective pressure 96 and results in the display signal 97 as indicated by dashed line. In the case shown in FIG. 11, a pressure between 0.1 and 1 mbar is determined as the adjustment point 102, more precisely about 0.2 mbar. 1n FIGS. 12.a) and 12.b) it is shown that the adjustment method can be improved if several pressure points are used in the method. By simultaneous readout at different pressure points p1 and p2, different calibration parameters result depending on the readout pressure point of the gas-type independent sensor 1, in this case K1 and K2, see FIG. 12.a). By means of suitable correction methods, such as a pressure-dependent first-order calibration factor in the pressure, it is now possible to correct characteristic curves which, as in the case of water vapor, have a slope in double-logarithmic representation which differs from that of other gases, so that again in the low-pressure range 5, in which the pressure can only be read out by the Pirani, the correct measurement signal is output. The effect of the adjustment 95 of the signal of the second pressure sensor is illustrated by bold arrows. The curve of the adjusted display signal 98 in water vapor, for example, is read in a method step at the effective pressure 96 and results in the display signal 98, as shown with dashed line. The pressures p1 and p2, which have the role of adjustment points, are slightly less than a decade apart. Specifically shown here is p1 approx. 0.5 mbar and p2 approx. 0.07 mbar.

In summary, therefore, the present invention and the above embodiments of the invention can achieve the following effects:
a) increase the accuracy of the pressure measurement over the entire pressure measurement range,
b) minimize the gas-type dependency even in the measurement range of pressure sensors with gas-type-dependent pressure measuring principles,
d) provide the ability to determine gas composition beyond pressure measurement within certain limits;
e) alert the user to a change in gas composition, or at least to a change in a gas-type dependent pressure measurement, so as to alert the user to unintended system changes; and
f) facilitate zeroing of pressure sensors as a secondary function.

LIST OF REFERENCE SIGNS

1 Group of pressure sensors
1' First pressure sensor of the group
1" Second pressure sensor of the group
2 Common measurement volume of the pressure sensors
3' First measurement signal
3" Second measurement signal
4' First pressure measurement range
4" Second pressure measurement range
5 Low-pressure range
6 Overlap pressure measurement range
10 Apparatus for carrying out the method
11' Pump
11" inlet valve
12 Control unit
13 Operative connection (for controlling a pump)
14 Operative connection (for controlling an inlet valve)
90 Optimum output signal (effective pressure=indicated pressure)
91 Signal of the first pressure sensor (for all gases)
92 Signal of the second pressure sensor in H2
93 Signal of the second pressure sensor in water vapor
94 Signal of the second pressure sensor in xenon
95 Adjustment of the signal of the second pressure sensor
96 Effective pressure in method step 1xx
97 Adjusted display signal in xenon
98 Adjusted display signal in water vapor
100 Method according to the invention
101 Step aa) Reading out the first and second measurement signals
102 Step bb) Stipulating adjustment point
103 Step cc) Determining at least one calibration parameter
104 Step dd) Further reading out of the first and second measurement signals
105 Step ee) of a further adjustment point
106 Step ff) Determining a further calibration parameter
107 Step gg) Determining current pressure measurement value
108 Step hh) Determining deviation from an expected slope
109 Step ii) Comparing the deviation with the tolerance threshold
110 Step jj) Triggering alarm water vapor
111 Step kk) Checking whether low-pressure range reached
112 Step ll) Reading out a first measurement signal (during pressure in the low-pressure range)
113 Step mm) Stipulating zero point signal
114 Step nn) Increasing the pressure
115 Step oo) Readout of a current first measurement signal
116 Step PP) Determining a current pressure measurement value (zero point signal taken into account)
120, 130, 140, 150 Embodiments of the method
K, K1, K2 Calibration parameters
P Pressure
p1 Measuring point 1 (pressure)
p2 Measuring point 2 (pressure)
t Time
START Start of a method (in a flowchart)
END End of a method (in a flowchart)

The invention claimed is:

1. A method (100) for operating a group (1) of pressure sensors, wherein the group comprises at least a first pressure sensor (1') having a first pressure measurement range (4') and a second pressure sensor (1") having a second pressure measurement range (4"), wherein the first and second pressure sensors are arranged in such a manner that they can measure the pressure in a common measurement volume (2), wherein the first (4') and second (4") pressure measurement ranges overlap in an overlap pressure measurement range (6), and wherein the method comprises the steps of:

aa) reading out (101) a first measurement signal of the first pressure sensor and a second measurement signal of the second pressure sensor substantially simultaneously while the pressure in the common measurement volume is in the overlap pressure measurement range;

bb) stipulating (102) the first measurement signal which has been read out as an adjustment point for the second pressure sensor;

cc) determining (103) a calibration parameter (K1), in particular a gas-dependent calibration parameter, for the second pressure sensor as a function of the first measurement signal, as a function of the adjustment point as stipulated in step bb) and as a function of the second measurement signal;

dd) reading out (104) a further first measurement signal of the first pressure sensor and a further second measurement signal of the second pressure sensor substantially simultaneously while the pressure in the common measurement volume is in the overlap pressure measurement range, wherein the pressure in the common measurement volume is different from the pressure in step aa);

ee) stipulating (105) the further first measurement signal which has been read out as a further adjustment point for the second pressure sensor;

ff) determining (106) a further calibration parameter (K2), in particular a further gas-dependent calibration parameter, for the second pressure sensor as a function of the further first measurement signal, as a function of the further adjustment point stipulated in step ee) and as a function of the further second measurement signal, wherein a current pressure measurement value in the measurement volume is determined as a function of a current second measurement signal and the determined calibration parameters (K1, K2), and wherein the further calibration parameter determined in step ff) is a slope in a double-logarithmic function diagram of the second measurement signal as a function of the first measurement signal, or wherein a slope in a double-logarithmic function diagram of the second measurement signal as a function of the first measurement signal is calculated from the calibration parameter determined in step cc) and the calibration parameter determined in step ff), and wherein the method further comprises:

hh) determining (108) a deviation of this slope from a slope expected for a reference gas;

ii) comparing (109) the deviation determined in step hh) with a predetermined tolerance threshold for the deviation; and jj) triggering (110) an alarm for presence of water vapor in the common measurement volume (2) if the tolerance threshold is exceeded.

2. The method (100) according to claim 1, wherein the adjustment point for the second pressure sensor is in the pressure range $10^{-2}$ mbar to $10^0$ mbar, in particular in the pressure range 0.1 to 0.4 mbar.

3. The method (120) according to claim 1, wherein, in step dd), the pressure in the common measurement volume differs by a factor of two, by a decade or more from the pressure in step aa).

4. The method (140) according to claim 1, wherein the reference gas is nitrogen.

5. The method (140) according to claim 1, wherein the first pressure sensor (1') is a pressure sensor of a pressure sensor type independent of a gas composition in the measurement volume, and wherein the second pressure sensor (1") is a pressure sensor of a pressure sensor type dependent on the gas composition in the measurement volume, in particular wherein the second pressure sensor (1") is
a heat conduction vacuum meter, especially according to Pirani or with thermocouple sensor, or
a cold cathode ionization vacuum meter, in particular a Penning ionization vacuum meter, or a non-inverted magnetron or an inverted magnetron, or
an ionization vacuum meter with hot cathode, in particular an ionization vacuum meter according to Bayard-Alpert, an ionization vacuum meter with extractor or with triode, or
a spinning rotor gauge sensor.

6. The method (140) according to claim 1, wherein the first pressure sensor (1') is a diaphragm gauge, in particular a capacitance diaphragm gauge, in particular a ceramic capacitance diaphragm gauge, or an optical diaphragm gauge.

7. The method (140) according to claim 1, wherein the second pressure sensor (1") is a heat conduction vacuum meter, in particular according to Pirani or a thermocouple.

8. The method (140) according to claim 1, wherein steps aa), bb) and cc) are repeated at regular time intervals, in particular once daily or once weekly.

9. The method (140) according to claim 1 for operating a vacuum process system, comprising the group (1) of pressure sensors, wherein steps aa), bb) and cc) are repeated once per process cycle of the vacuum process system.

10. The method (150) according to claim 1, wherein the second pressure measurement range comprises a low-pressure range (5) in which the pressure is lower than a lower limit of the first pressure measurement range, wherein the method comprises the steps of:

kk) checking (111) whether the low-pressure range has been reached by means of a second measurement signal (3") from the second pressure sensor;

ll) Reading out (112) a first measurement signal (3') of the first pressure sensor while the pressure in the common measurement volume is in the low-pressure range; and mm) stipulating (113) the first measurement signal which has been read out as a zero point signal for the first pressure sensor.

11. The method (150) according to claim 10, wherein the method further comprises the steps of:

nn) increasing (114) the pressure in the common measurement volume to the first pressure measurement range (4');

oo) reading out (115) a current first measurement signal (3') of the first pressure sensor;

pp) determining (116) a current pressure measurement value as a function of the current first measurement signal and the zero point signal determined in step mm), in particular as a function of a difference of the current first measurement signal and the zero point signal.

12. The method (150) according to claim 10, wherein the low-pressure range (5) comprises only pressures that are lower than the lower limit of the first pressure measurement range by at least a factor of ten, in particular by at least a factor of one hundred.

13. The method (150) according to claim 10, wherein the low-pressure range (5) comprises a range of $10^{-3}$ mbar up to $10^{-4}$ mbar.

14. The method according to claim 1 wherein the group of pressure sensors comprises at least three pressure sensors, and wherein the steps are applied to a first pair of pressure sensors from the group of pressure sensors, and wherein the steps are applied to a second pair of pressure sensors from the group of pressure sensors, wherein one of the pressure sensors of the first pair is also a pressure sensor of the second pair.

15. The method (140) according to claim 1, wherein the method further comprises:
- gg) deciding (107) whether a gas composition present in the common measurement volume (2) deviates from a target specification, taking into account a deviation of the current pressure measurement value with respect to a pressure measurement value derived from the first measurement signal, and
  wherein the reading out of the first measurement signal is performed substantially simultaneously with the reading out of the current second measurement signal and while the pressure in the common measurement volume is in the overlap pressure measurement range (6).

16. An apparatus (10) for carrying out a method according to claim 1, wherein the apparatus comprises:
- a group (1) of pressure sensors,
  wherein the group comprises at least a first pressure sensor (1') having a first pressure measurement range (4') and a second pressure sensor (1") having a second pressure measurement range (4"), wherein the first and second pressure sensors are arranged to measure pressure in a common measurement volume (2), and
  wherein the first (4') and second (4") pressure measurement ranges overlap in an overlap pressure measurement range (6); and
- a control unit (12), which is operatively connected to a first signal output of a first vacuum pressure sensor and to a second signal output of a second vacuum pressure sensor, for processing measurement signals (3', 3") of the vacuum pressure sensors.

17. The apparatus (10) according to claim 16, wherein the first pressure sensor (1') is a diaphragm gauge, wherein the overlap pressure measurement range (6) in which the first (4') and second (4") pressure measurement ranges overlap comprises pressure 0.1 mbar, and wherein the group (1) of pressure sensors comprises a third pressure sensor having a third pressure measurement range, wherein the third pressure measurement range extends the first pressure measurement range to greater pressures.

18. The apparatus (10) according to claim 16, further comprising at least one means for changing the pressure in the common measurement volume, wherein the at least one means for changing the pressure is operatively connected to a pressure control unit (12) for initiating a lowering or an increasing of the pressure in the common measurement volume.

19. A computer program product comprising instructions which, when the instructions are executed by a control unit (12) of an apparatus (10) according to claim 16, cause the control unit to perform the steps of the method (140, 150).

* * * * *